(12) United States Patent
Keil et al.

(10) Patent No.: US 7,827,203 B2
(45) Date of Patent: Nov. 2, 2010

(54) SYSTEM TO DETERMINE RESPONDENT-SPECIFIC PRODUCT ATTRIBUTE LEVELS

(75) Inventors: Sev K. H. Keil, Anif (AT); Dick R. Wittink, North Haven, CT (US); Hiek Roelof Van der Scheer, Rossum (NL)

(73) Assignee: True Choice Solutions, Inc., New York, NY (US)

( * ) Notice: Subject to any disclaimer, the term of this patent is extended or adjusted under 35 U.S.C. 154(b) by 350 days.

(21) Appl. No.: 11/089,271

(22) Filed: Mar. 24, 2005

(65) Prior Publication Data

US 2006/0218162 A1    Sep. 28, 2006

(51) Int. Cl.
  *G06F 7/00* (2006.01)
  *G06F 17/30* (2006.01)
(52) U.S. Cl. ..................................................... 707/796
(58) Field of Classification Search ................. 707/796, 707/758
  See application file for complete search history.

(56) References Cited

U.S. PATENT DOCUMENTS

| 5,583,763 | A  | * | 12/1996 | Atcheson et al. | ............... | 707/3 |
| 6,236,990 | B1 | * | 5/2001  | Geller et al.   | ................... | 707/5 |
| 6,826,541 | B1 | * | 11/2004 | Johnston et al. | ........... | 705/36 R |
| 7,191,143 | B2 | * | 3/2007  | Keli et al.     | ..................... | 705/10 |
| 7,191,144 | B2 | * | 3/2007  | White           | ......................... | 705/10 |

| 2002/0087388 | A1 | * | 7/2002 | Keil et al.    | .................... | 705/10 |
| 2003/0040952 | A1 | * | 2/2003 | Keil et al.    | .................... | 705/10 |
| 2003/0088457 | A1 | * | 5/2003 | Keil et al.    | .................... | 705/10 |
| 2004/0148210 | A1 | * | 7/2004 | Barrett et al. | ................... | 705/7  |

FOREIGN PATENT DOCUMENTS

WO    WO 2004/012679 A2    2/2004

OTHER PUBLICATIONS

"Active Buyer's Guide: Dogs", Copyright © 2002 Active Decisions Inc. [Retrieved Jul. 26, 2002] Retrieved from Internet: URL: < http://www9.activebuyerguide.com/abg/nav/StartGuide.cfm > 10pgs.
Active Sales Assistant © 2001 Active decisions, Inc., Jun. 2001, 12pgs.

\* cited by examiner

*Primary Examiner*—John R Cottingham
*Assistant Examiner*—Hexing Liu
(74) *Attorney, Agent, or Firm*—Fish & Richardson P.C.

(57)    ABSTRACT

Provided in some aspects are reception of an indication of one or more acceptable product attribute levels of a first product attribute, and determination of one or more product attribute levels of a second product attribute based on the one or more attribute levels of the first attribute and on an association between at least a first attribute level of the first attribute and a second attribute level of a second attribute. Further to the above aspect, some aspects provide presentation, prior to the reception step, of a plurality of attribute levels of the first attribute, and presentation of the one or more attribute levels of the second attribute, wherein attribute levels of only one attribute are simultaneously presented.

19 Claims, 15 Drawing Sheets

| Client: ABC Motors; Product: Passenger Automobile 502 | | | |
|---|---|---|---|
| Brand 503 | Price 504 | Horsepower 505 | Styles 506 |
| Golf | $25,000 to $35,000 | 170 to 200 | 2-door, 4-door |
| Lupo | $15,000 to $25,000 | 120 to 180 | 2-door |
| Polo | $15,000 to $30,000 | 120 to 200 | 2-door, 4-door |

FIG. 5

SYSTEM TO DETERMINE RESPONDENT-SPECIFIC PRODUCT ATTRIBUTE LEVELS

BACKGROUND

1. Field

The present invention relates to systems for determining product attribute levels. In some aspects, the invention relates to systems used for determining respondent preferences based on a set of product attribute levels specific to the respondent.

2. Discussion

Product manufacturers are presented with many choices during the design of a product. For each of several product attributes, a manufacturer must choose from among several attribute levels to include in a product. These choices may be facilitated by obtaining information relating to consumer preferences.

A consumer may be any entity to which a product and/or service may be offered, including individuals or businesses. Preference information can be used to determine the popularity and desirability of particular product attributes and attribute levels to such consumers. Therefore, preference information may allow a manufacturer to choose product configurations as well as production amounts and prices for each product configuration that maximize overall profit.

Significant resources are currently expended to obtain detailed and accurate consumer preference information. These resources are most commonly allotted to conventional consumer surveys, which typically consist of a list of predetermined questions designed to elicit information from a consumer regarding the consumer's feelings toward products, product attributes, and product attribute levels. Surveys may be administered randomly, for example by stopping consumers at shopping malls or other retail areas, or by contacting specific consumers who are targeted because they are members of a demographic group about which information is desired.

Conventional surveys present several inherent drawbacks. First, since survey results are compiled into general demographic categories, surveys merely determine, at best, preferences of a theoretical average consumer belonging to each demographic category. Accordingly, survey results are only marginally correlated to any one consumer's preferences. Therefore, such results lack predictive precision of a particular consumer's preferences with respect to marketplace choices available and not yet available. Second, although conventional surveys may indicate whether one attribute level (e.g. "sedan body style") is generally preferred over another level of the same attribute ("coupe body style color"), such surveys do not provide any reliable means for comparing preferences across attributes. For example, conventional surveys are generally unable to determine the degree to which a consumer prefers a sedan body style over another body style so as to enable comparison between that degree and the degree to which the consumer prefers a 150 horsepower engine over an engine generating a different amount of horsepower. As a result of these drawbacks, conventional surveys do not adequately produce useful preference information.

Focus groups are another conventional vehicle used to obtain consumer preference information. In a typical focus group, certain consumers are randomly selected (or selected based on demographics as described above) to answer questions and/or to participate in a group discussion regarding a product or a type of product. Answers and comments of the consumers are noted and tabulated to create preference information similar to that obtained using survey techniques. Due to their interactive nature, focus groups may elicit more useful information than that elicited by surveys. Despite this advantage, focus groups still suffer from the drawbacks described above with respect to conventional surveys.

Trade-off analysis techniques attempt to address the above and other deficiencies in conventional techniques for determining consumer preference information. Generally, trade-off analysis techniques attempt to quantify a consumer's preference for particular product attributes and attribute levels. Such quantification is intended to allow a manufacturer to easily and accurately compare the attractiveness of various product configurations to a consumer. These comparisons are possible because the trade-off techniques associate a particular numerical value with a consumer's preference for each attribute and attribute level. Accordingly, the relative attractiveness of any attribute or attribute level with respect to any other attribute or attribute level can be determined simply by comparing the appropriate associated numerical values.

According to one classification scheme, four types of trade-off analysis techniques exist: conjoint; discrete choice; self-explicated; and hybrid. Conjoint analysis generally requires a consumer to rate or rank product configurations with respect to one another. Typically, the consumer is asked to rank twenty to thirty product configurations. Each ranked configuration includes different combinations of attributes and attribute levels being evaluated. By appropriately varying the configurations, a regression model can be estimated for each consumer.

Conjoint analysis is an improvement over conventional systems for determining consumer preferences. For example, determining preferences by observing consumer behavior is difficult because consumer behavior can usually be observed only with respect to a few combinations of attributes and attribute levels (i.e., the combinations that exist in the marketplace). Accordingly, it becomes difficult to separate and distinguish between the preferences of different consumers and to predict effects of changes in attributes and/or attribute levels on consumer behavior. On the other hand, conjoint analysis allows for improved learning of consumer preferences through controlled variation and controlled co-variation of attributes and attribute levels.

According to discrete choice analysis, a consumer is presented with a set of product configurations and asked to select either the configuration that the consumer is most interested in purchasing or no configuration if the consumer is not interested in purchasing any of the presented configurations. The process is then repeated for other sets of product configurations. In contrast to conjoint analysis, which may be used to estimate a regression model for individual consumers, discrete choice analysis may be used to estimate a mixture method (similar to a regression model) for a group of consumers.

While conjoint analysis and discrete choice analysis determine consumers' preferences indirectly, self-explicated analysis directly determines preferences by asking consumers how important each product attribute range and attribute level range is to their purchasing decisions. According to some self-explicated analysis models, consumers are presented with all attributes and attribute levels to be evaluated, and asked to identify attribute levels that are unacceptable. An unacceptable attribute level is one that, if included in a product, would cause the product to be completely unacceptable to the consumer, regardless of any other attributes and attribute levels included in the product. For example, a consumer may indicate that an automobile including an attribute level of "pink" associated with the attribute "color" is completely unacceptable regardless of any other attributes or attribute levels included in the automobile. Accordingly, "pink" is identified as an unacceptable attribute level for that consumer.

Next, the consumer is asked to identify, from the acceptable attribute levels, the most-desirable and the least-desirable attribute levels associated with each presented attribute. Assuming that the consumer's most important attribute has a rating of 100, the consumer is then asked to rank the relative importance of each remaining attribute from 0 to 100. Next, for each attribute, the desirability of each attribute level is rated with respect to all other acceptable attribute levels of the attribute. A consumer preference for an attribute level is then obtained by multiplying the relative importance of its associated attribute by its desirability rating.

Hybrid analysis techniques utilize a combination of features from the above-described techniques. The most common example of a hybrid analysis technique is Adaptive Conjoint Analysis (ACA), a product of Sawtooth Software, Inc. According to ACA, a consumer is taken through several rankings of attribute levels and ratings of relative attribute importance (similar to self-explicated techniques) and then asked to identify, for each of a series of pairs of product configurations, which one of the pair is the most desirable and the degree to which it is more desirable. Other examples of hybrid models include the Cake Method and the Logit-Cake Method developed by MACRO Consulting, Inc.

Each of these trade-off analysis techniques requires consumers to provide consistent, thoughtful responses to presented inquiries. A consumer may be able to provide such responses if presented with a small number of inquiries, but is unlikely to do so if presented with many inquiries. In this regard, the number of inquiries presented by each of the above techniques increases sharply as the number of evaluated attributes and/or attribute levels increases. Such an increase in the number of inquiries also causes a corresponding increase in the amount of time required to answer the inquiries. Therefore, as more attributes and attribute levels are evaluated, various forms of consumer bias are likely to increase, such as a waning attention span, a lack of time, a lack of patience, boredom, and haste. These increased consumer biases result in increased consumer error and inaccurate preference information. Also increased is a consumer's tendency to abandon the technique and to simply cease answering further inquiries, in which case the resulting preference information is partially or totally unusable.

Another form of consumer bias is caused by consumer attitudes toward particular attributes and/or attribute levels. As described above, conventional trade-off analysis techniques ask a consumer to evaluate the importance of an attribute or attribute level with respect to other attributes or attribute levels. However, if the consumer has an extreme dislike for one of the attributes or attribute levels, the consumer may overestimate the importance of the other attributes or attribute levels.

Each of the foregoing shortcomings might be addressed by reducing a number of attribute levels that are considered during trade-off analysis. However, reducing the number of attribute levels may cause an unsatisfactory decrease in the accuracy and comprehensiveness of preference information generated by existing systems. Moreover, existing systems do not provide any efficient process for determining those attribute levels that may generate satisfactory preference information for a particular consumer.

SUMMARY

In order to address the foregoing, embodiments of the present invention provide a system, method, device, medium and means to receive an indication of one or more acceptable product attribute levels of a first product attribute, and to determine one or more product attribute levels of a second product attribute based on the one or more attribute levels of the first attribute and on an association between at least a first attribute level of the first attribute and a second attribute level of a second attribute.

Further to the above aspect, embodiments may also provide simultaneous presentation of the one or more attribute levels of the first attribute and the one or more attribute levels of the second attribute. Alternatively, some aspects provide presentation, prior to the reception step, of a plurality of attribute levels of the first attribute, and presentation of the one or more attribute levels of the second attribute, wherein attribute levels of only one attribute are simultaneously presented.

In other aspects, an indication of a respondent of one or more sets of product attribute levels is received, each of the one or more sets of attribute levels comprising one or more attribute levels of a plurality of product attributes, and one or more attribute levels based on the one or more sets of attribute levels are determined. Further to this aspect, each of the one or more sets of attribute levels may represent a respective product, and the indication may comprise a selection of one or more products by the respondent.

According to some embodiments, an interface includes elements representing attribute levels of a plurality of attributes, a first interface control to select one or more elements representing one or more attribute levels of a first attribute, and an indicator to indicate one or more attribute levels of a second product attribute that are consistent with the one or more attribute levels of the first attribute, the one or more attribute levels of the second product determined based on the one or more attribute levels of the first attribute and on an association between at least a first attribute level of the first attribute and a second attribute level of a second attribute.

A technical content of some embodiments is an efficient, computer-implemented computation of attribute levels specific to a respondent. With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 5 is a representative view of a tabular portion of a product database according to some embodiments of the present invention.

DETAILED DESCRIPTION

Network Architecture

Figure 1:
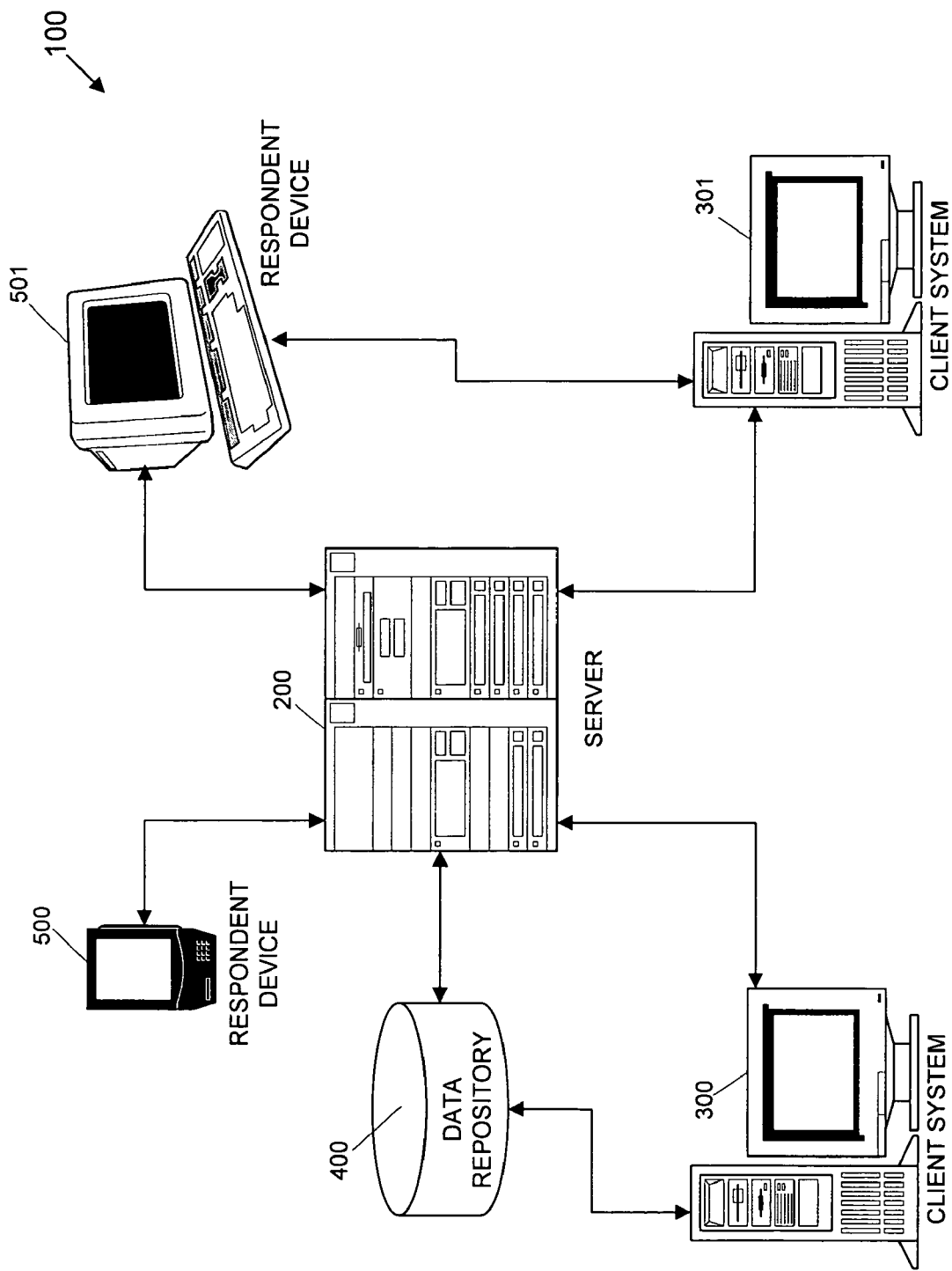
FIG. 1 is a topographic view of a network architecture according to some embodiments of the present invention.

FIG. 1 is a topographic view of network architecture 100 according to some embodiments of the present invention. Of course, many other architectures may be used to implement embodiments of the invention. Network architecture 100 includes server 200, which is depicted as a mainframe computer. Server 200 may be used to perform process steps 600 of FIG. 6 in order to determine attribute levels specific to a particular respondent. The attribute levels may in turn be used to determine preference information for the respondent. Server 200 may be operated by a company, such as assignee Blue Flame Data, Inc., that provides preference information to clients.

Many types of computing hardware may be used to perform the functions of server 200, including, but not limited to, a server, a workstation, a network, or any combination of one or more of the foregoing. Further details of server 200 are set forth below with respect to FIG. 2.

Client systems 300 and 301 are in communication with server 200. Client systems 300 and 301 may be used according to some embodiments of the present invention to perform any functions required by a client, including scheduling, inventory tracking, billing, accounting, etc. Client systems 300 and 301 may also be used to provide server 200 with attributes and attribute levels of interest, associations between attribute levels of different attributes, and information for modifying thresholds or other parameters used by server 200 to determine preference information.

Client systems 300 and 301 may also receive information from server 200 intended for display to a client. Such information may include real-time monitoring of respondent responses, scenario simulations, or an interface allowing the operator to tweak existing thresholds or parameters while responses are being received from respondents.

As shown in FIG. 1, client systems 300 and 301 comprise desktop computer systems. Any other suitable devices may be used as client systems 300 and/or 301 according to some embodiments of the invention, including but not limited to a workstation, a mainframe computer, a kiosk, a personal digital assistant and a computer terminal. In the case that one of client systems 300 and 301 comprises a system having its own input and/or output devices, such as a kiosk, the system may be used to display interfaces according to some embodiments to a respondent and to receive indications from the respondent input thereto.

Server 200 may determine product attribute levels using data from other sources such as data repository 400. Data repository 400 stores information usable by server 200 in accordance with the processes described herein. The information may include preference information, product information including product attributes and attribute levels, respondent demographic information, and process steps executable to determine attribute levels specific to a respondent. The information may be received by data repository 400 from other sources or may be generated, in whole or in part, by data repository 400.

Respondent devices 500 and 501 may present interfaces to a respondent through which the respondent may indicate one or more acceptable product attribute levels and/or sets of product attribute levels. Respondent devices 500 and 501 respectively comprise a personal digital assistant and a workstation. However, respondent devices 500 and 501 may include any device or combination of devices capable of presenting information, visually and/or aurally, and of transmitting information to an external device. Of course, respondent devices 500 and 501 should be able to communicate with the device or devices with which they are in communication over whatever types of network media exist between the devices.

Although the connections illustrated between the components of FIG. 1 appear dedicated, it should be noted that each of the connections may be shared by other components. Moreover, the connections may comprise one or more of a local area network, a wide area network, a telephone network, a cellular network, a fiber-optic network, a satellite network, an infra-red network, a radio frequency network, or any other type of network which may be used to transmit information among two or more of the devices. Additionally, the devices shown as in communication with other devices need not be constantly exchanging data, rather, the communication may be established when necessary and severed at other times or always available but rarely used to transmit data.

Server

Figure 2:
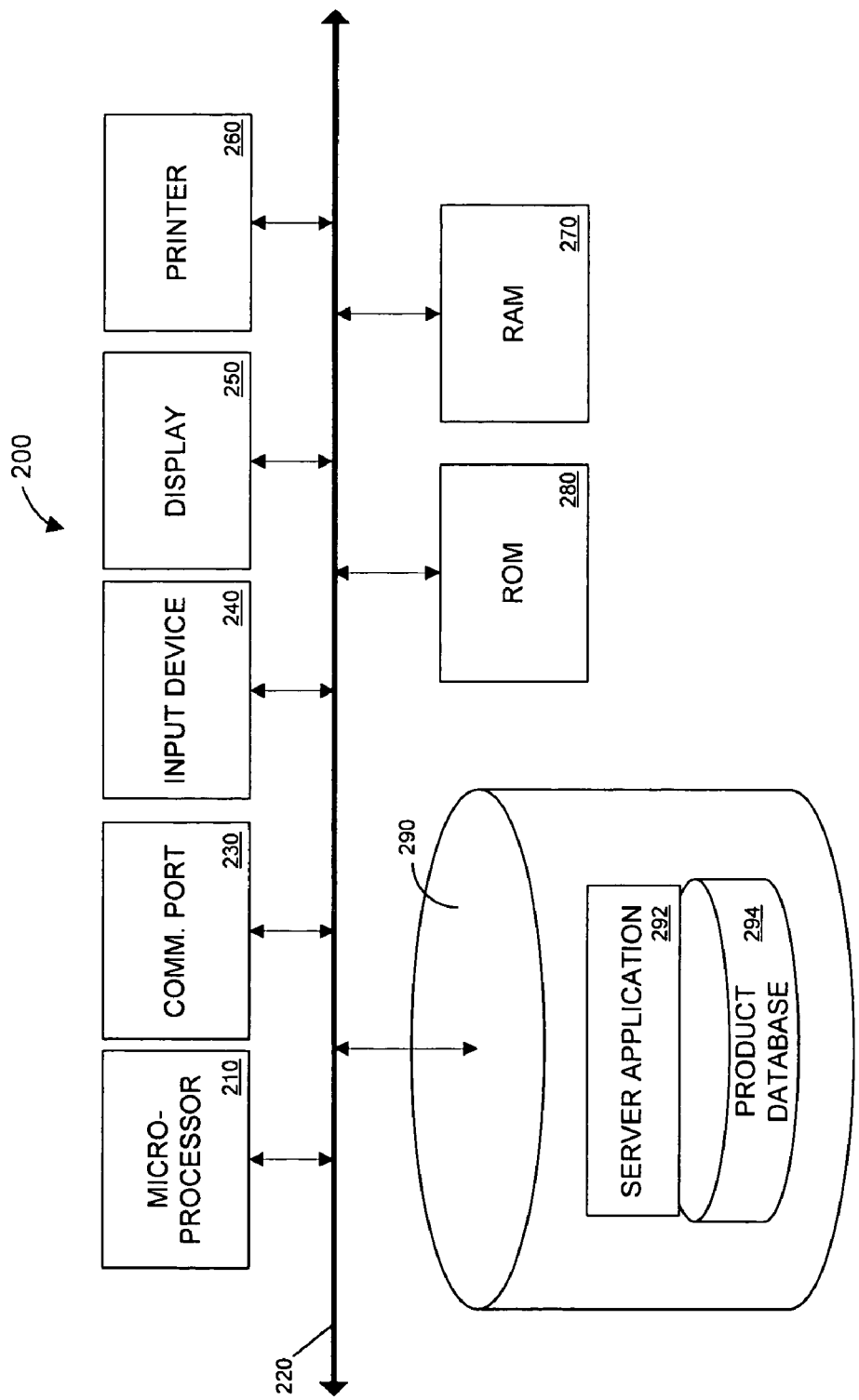
FIG. 2 is a block diagram of an internal architecture of a server according to some embodiments to the present invention.

FIG. 2 is a block diagram of the internal architecture of server 200 according to some embodiments of the invention. As illustrated, server 200 includes microprocessor 210 in communication with communication bus 220. Microprocessor 210 may be a Pentium, RISC-based, or other type of processor and is used to execute processor-executable process steps so as to control the components of server 200 to provide desired functionality.

Also in communication with communication bus 220 is communication port 230. Communication port 230 is used to transmit data to and to receive data from external devices. Communication port 230 is therefore preferably configured with hardware suitable to physically interface with desired external devices and/or network connections. In one embodiment, interfaces are transmitted to and designations are received from respondent device 500 over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an operator to input product-related information such as attributes and attribute levels, respondent-related information such as contact and identification information, client-related information such as billing and transaction information, and commands to server 200. In this regard, input device may be used to input a command to server 200 for outputting a report detailing a particular client's account or attribute levels specific to a particular respondent.

Such a report may be output to display 250, which may be an integral or separate CRT display, flat-panel display or the like. Display 250 is used to output graphics and text to an operator in response to commands issued by microprocessor 210. Printer 260 is also an output device, but produces a hardcopy of data using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230.

Data storage device 290 stores, among other data, processor-executable process steps of server application 292. According to some embodiments of the present invention, the process steps of server application 292 may be read from a computer-readable medium, such as a floppy disk, a CD-ROM, a DVD-ROM, a Zip disk, a magnetic tape, or a signal encoding the process steps, and then stored in data storage device 290. Server application 292 may be stored in data storage device 290 in a compressed, uncompiled and/or encrypted format. Microprocessor 210 executes instructions of application 292, and thereby operates in accordance with the present invention, and particularly in accordance with the process steps described in detail herein.

Specifically, according to some embodiments of the invention, microprocessor 210 executes processor-executable process steps of server application 292 to receive an indication of one or more acceptable product attribute levels of a first product attribute, and to determine one or more product attribute levels of a second product attribute based on the one or more attribute levels of the first attribute and on an association between at least a first attribute level of the first attribute and a second attribute level of a second attribute.

According to some embodiments, an indication of a respondent of one or more sets of product attribute levels is received, each of the one or more sets of attribute levels comprising one or more attribute levels of a plurality of product attributes, and one or more attribute levels based on the one or more sets of attribute levels are determined. Each of the one or more sets of attribute levels may represent a respective product, and the indication may comprise a selection of one or more products by the respondent.

Process steps of server application 292 may also provide an interface including elements representing attribute levels of a plurality of attributes, a first interface control to select one or more elements representing one or more attribute levels of a first attribute, and an indicator to indicate one or more attribute levels of a second product attribute that are consistent with the one or more attribute levels of the first attribute, the one or more attribute levels of the second product determined based on the one or more attribute levels of the first attribute and on an association between at least a first attribute level of the first attribute and a second attribute level of a second attribute.

In alternative embodiments, hard-wired circuitry may be used in place of, or in combination with, processor-executable process steps for implementation of the processes of some embodiments of the present invention. Thus, embodiments of the present invention are not limited to any specific combination of hardware and software.

Server application 292 may also include processor-executable process steps to provide a Web server. Such a Web server would allow server 200 to communicate with client systems 300 and 301 as well as respondent devices 500 and 501 through the World Wide Web.

Also stored in data storage device 290 is product database 294. Product database 294 includes sets of attribute levels that may or may not represent particular products. These sets may represent associations between attribute levels of different attributes. Product database 294 will be discussed in detail with reference to FIG. 5.

Data storage device 290 furthermore includes program elements that may be necessary for operation of server 200, such as an operating system, a database management system and "device drivers" for allowing microprocessor 210 to interface with devices in communication with communication port 230. These program elements are known to those skilled in the art, and need not be described in detail herein. Of course, data storage device 290 may also include applications and data for providing functionality unrelated to the present invention.

Client System

Figure 3:
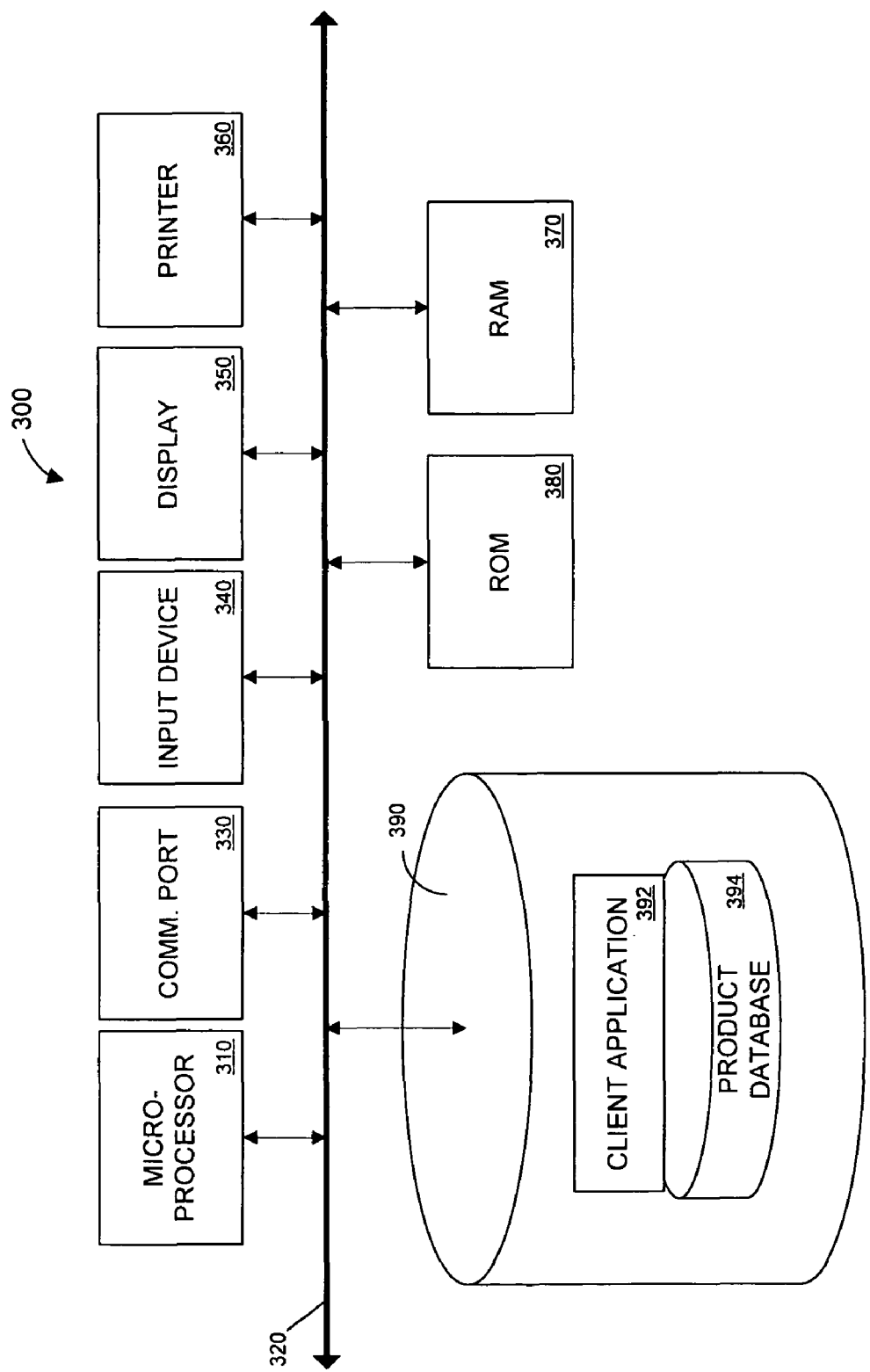
FIG. 3 is a block diagram of an internal architecture of a client system according to some embodiments to the present invention.

FIG. 3 illustrates an internal architecture of client system 300. As shown, client system 300 according to the depicted embodiment includes microprocessor 310, communication port 330, input device 340, display 350, printer 360, RAM 370 and ROM 380, each of which is in communication with communication bus 320. Possible embodiments for each of these components are similar to those described with respect to identically-named components of FIG. 2, although functions performed by the components of FIG. 3 according to some embodiments of the invention may differ from those performed by the components of FIG. 2.

Specifically, input device 340 may be used by a client to input product attributes and attribute levels of interest, and also to input demographic information of respondents for whom attribute levels are to be determined. Display 350 and printer 360 may be used to output information received from server 200, such as determined attribute levels and/or preference information determined therefrom. Of course, this information may be determined by client system 300 instead of being received from server 200. In a case that client system 300 is a kiosk or other device usable by both a respondent and a client manufacturer, input device 340, display 350 and printer 360 may also be used by a respondent to view interfaces and to input indications thereto that are subsequently received from server 200.

Data storage device 390 stores client application 392 and product database 394. Client application 392 includes processor-executable process steps which may be executed by microprocessor 310 to perform the process steps described herein. According to some embodiments of the invention, client application 392 includes process steps to provide the functions attributed herein to server 200.

Client application 392 may also include processor-executable process steps to provide a Web browser. As described with respect to server 200, such a Web browser would allow client system 300 to communicate with a Web server executed by server 200. Product database 394 includes information similar to that included in product database 294. The information included in product database 394 may be input by a manufacturer operating client system 300. As mentioned with respect to server 200, data storage device 390 may also store applications, data, operating system and device driver files used to provide functionality that is related and unrelated to the present invention.

Respondent Device

Figure 4:
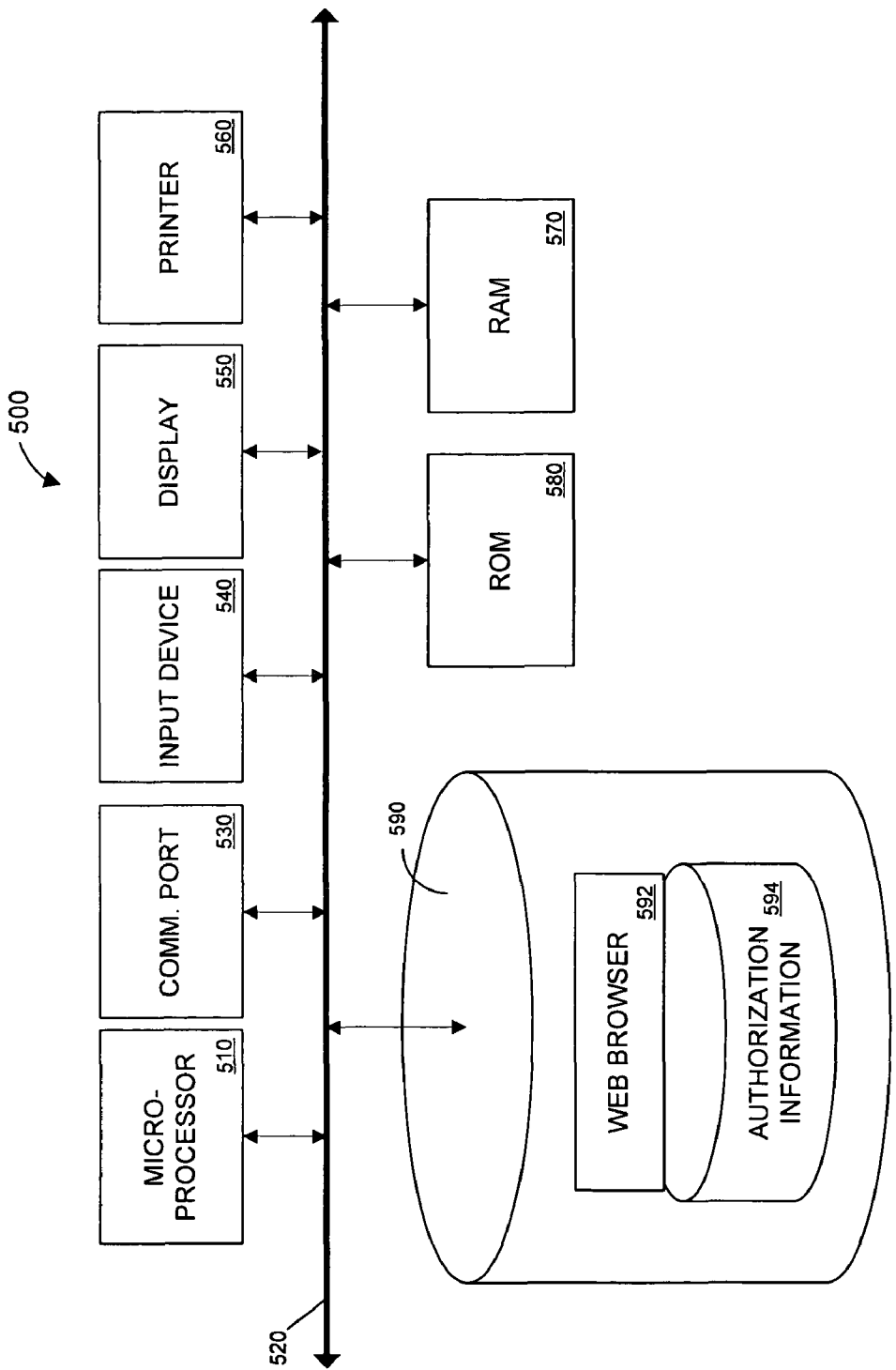
FIG. 4 is a block diagram of an internal architecture of a respondent device according to some embodiments to the present invention.

FIG. 4 illustrates several components of respondent device 500 according to some embodiments of the invention. As briefly described above, communication port 530 may be used to receive interfaces and/or queries from server 200 and to input indications and/or responses thereto. In this regard, input device 540 may be used by a respondent to manipulate an interface presented on display 550 so as to indicate one or more acceptable attribute levels of an attribute. Input device 540, display 550 and printer 560 may also be used in conjunction with other applications provided by respondent device 500 which are unrelated to the present invention.

Storage device 590 of respondent device 500 stores processor-executable process steps of Web browser 592. The process steps may be executed by microprocessor 510 to allow communication with Web servers such as the Web server provided by server application 292 of index server 200. Authorization data 594 includes information used to determine whether a user of respondent device 500 is authorized to receive interfaces and/or queries from server 200. For example, authorization data 594 may include usernames and passwords of users who might operate respondent device 500. The information may also be transmitted to server 200 to ensure that a user of respondent device 500 is a respondent of whom preference information is desired. Information may be stored in authorization data 594 in the form of Web cookies.

Storage device 590 may store one or more of other applications, data files, device drivers and operating system files needed to provide functions other than those directly related to the present invention. Such functions may include calendaring, e-mail access, word processing, accounting, presentation development and the like.

Product Database

A tabular representation of a portion of product database 294 is shown in FIG. 5. Product database 294 stores data specifying attributes and attribute levels for particular products and particular clients. This data reflects associations between attribute levels of a first attribute and attribute levels of a second attribute.

Client:product field 502 indicates a client and a product category, while fields 503 through 506 specify attributes of the product that are of interest to the client. Accordingly, the FIG. 5 representation provides client-specific attributes and attribute levels for a particular product. In this regard, product database 294 may omit attributes and/or attribute levels of a product if the client is not concerned with those attributes and/or attribute levels. Product database 294 may also specify attributes and attribute levels for a particular product that are not associated with any one particular client.

Brand field 503 of each record of database 294 specifies a brand of the subject product. Each record also specifies one or more prices, horsepowers and styles associated with the specified brand. Accordingly, each record represents one or more combinations of attribute levels that may be included in a particular product. For example, the first illustrated record represents a product having the set of attribute levels "Golf", "$25,000", "170 Hp" and "2-door", and also a product having the set of attribute levels "Golf", "$30,000", "190 Hp" and "4-door".

Although shown in FIG. 5 are data specifying particular attributes and attribute levels, some embodiments of the invention contemplate evaluating fewer or more attributes and/or attribute levels for any particular product. Additionally, it is contemplated that product database 294 may store data for multiple products and/or multiple clients. In contrast, it is contemplated that, in some embodiments, product database 394 of in client system 300 might store only data associated with the particular client operating client system 300.

As will be understood by those skilled in the art, the tabular illustration and accompanying description of product database 294 merely represent relationships between stored information. A number of other arrangements may be employed besides those suggested by the illustration. Similarly, the illustrated entries of the database represent sample information only; the reader will understand that the number and content of the entries can be different from those illustrated.

Specific Examples

Figure 6:
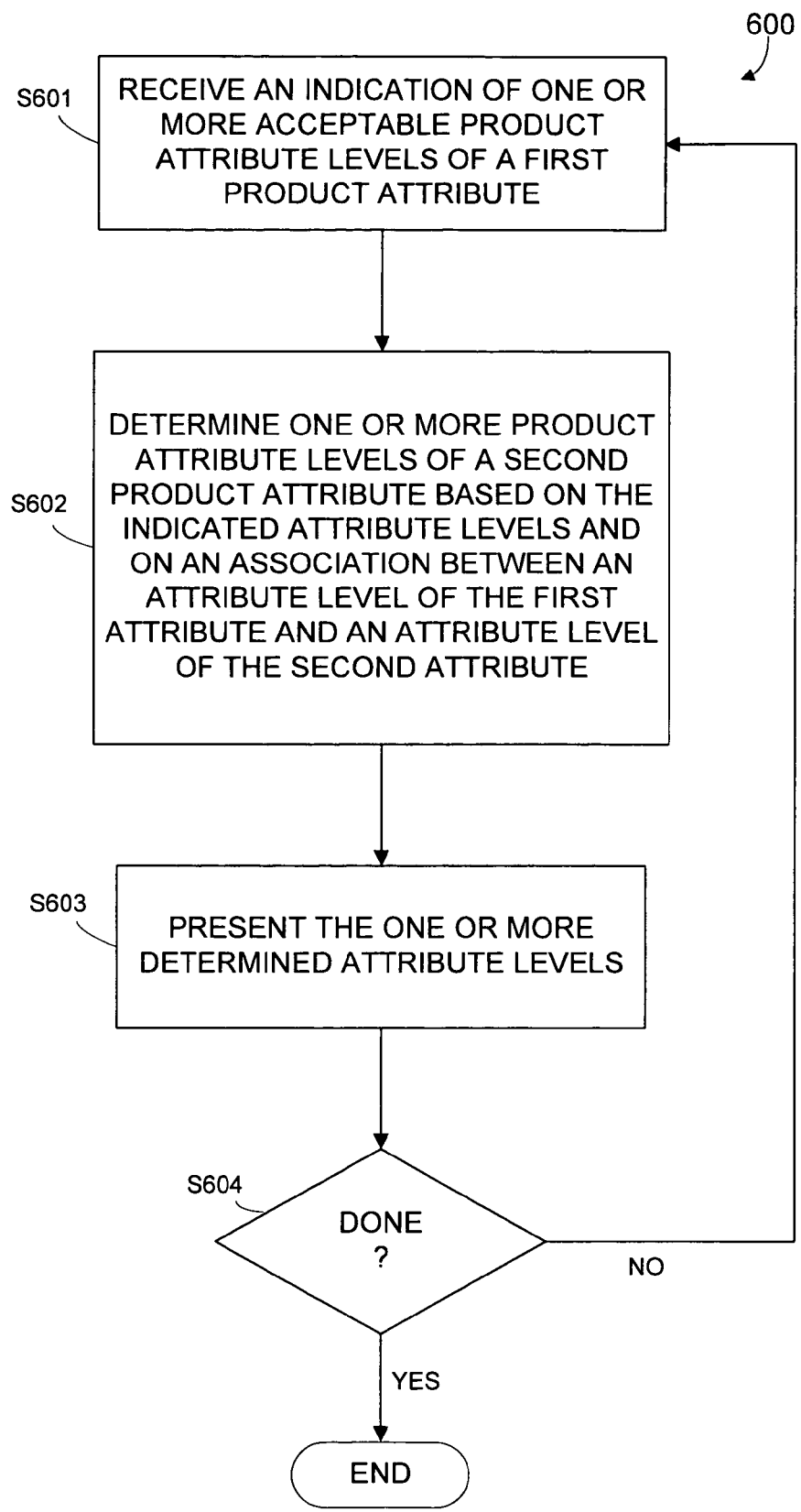
FIG. 6 comprises a flow diagram of process steps according to some embodiments of the present invention.

FIG. 6 comprises a flow diagram of process steps 600 to determine attribute levels according to some embodiments of the present invention. Process steps 600 are described herein as being performed by server 200 through execution of processor-executable process steps of server application 292 by microprocessor 210. However, process steps 600 may also be performed, in whole or in part, by one or more of server 200, client systems 300 and 301, respondent devices 500 and 501, another device, and manual means.

Prior to process steps 600, a respondent is presented with an interface according to some embodiments. More particularly, a respondent operates respondent device 501 to receive, perhaps via the Web, an interface for indicating acceptable attribute levels. The interface may be presented to the respondent via display 550 of respondent device 500.

Figure 7:
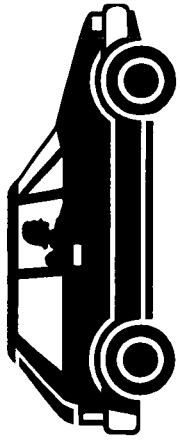
FIG. 7 is a view of an interface used to receive indications from a respondent according to some embodiments of the present invention.

Interface 700 of FIG. 7 includes elements 701 through 713 representing attribute levels of a plurality of attributes and interface controls 720 through 723, which are used to select one or more elements representing one or more attribute levels of a first attribute. The attributes and attribute levels of interface 700 may include some or all of the attributes and attribute levels of product database 294. In some embodiments, client system 301 indicates, using rules and/or explicit indications, the attributes and attribute levels presented by interface 700.

Associated with each attribute is interface control 725, which allows a respondent to indicate that an attribute is unimportant. Upon selection of one of interface controls 725, associated attribute levels may be removed from interface 700 or otherwise rendered unselectable.

Figure 8:
FIG. 8 is a view of an interface used to receive indications from a respondent according to some embodiments of the present invention.

In one example of operation, a respondent operates input device 540 to select interface control 720. The respondents then manipulates (e.g., using a "click-and-drag" operation) control 720 to select a range of attribute levels as shown in FIG. 8. The selected range of attribute levels is presented to the respondent beneath control 720, and represents attribute levels of a first attribute that are acceptable to the respondent. In some embodiments, one or more attribute levels may be associated with a minimum selectable range that may also be specified by client system 301.

An indication of the acceptable product attribute levels is received by server 200 in step S601. The indication may comprise any communication from respondent device 501 that identifies the selected attribute levels. Next, in step S602, one or more attribute levels of a second attribute are determined based on the selected attribute levels. More particularly, the attribute levels are determined based on the selected attribute levels and on an association between one or more attribute levels of the first attribute and one or more attribute levels of the second attribute.

Associations relevant to the present example are reflected in FIG. 5. According to these associations, the selected range of attribute levels is consistent with attribute levels 120 and 170 of the Horsepower attribute. The selected range is also consistent with attribute levels Lupo and Polo of the Brand attribute, and with the attribute level 2-door of the Style attribute. The associations between attribute levels of different attributes may be determined, presented and used other than as described above and as represented in FIG. 5.

Figure 9:
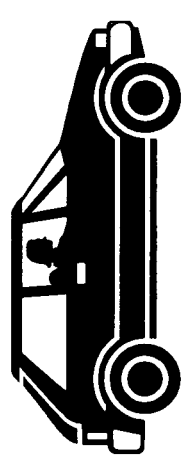
FIG. 9 is a view of an interface used to receive indications from a respondent according to some embodiments of the present invention.

The determined attribute levels are presented in step S603. More particularly, server 200 may transmit an interface that presents the determined attribute levels to respondent device 501. Interface 700 of FIG. 9 is one example of such an interface. Interface 700 of FIG. 9 includes indicators 901 through 903, which indicate one or more attribute levels of attributes that are consistent with the selected attribute levels.

Figure 10:
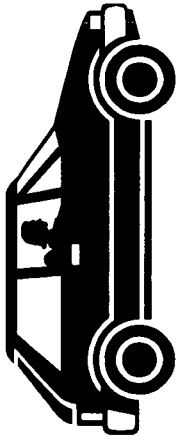
FIG. 10 is a view of an interface used to receive indications from a respondent according to some embodiments of the present invention.

If it is determined in step S604 that the respondent has selected Done icon 730, process steps 600 terminate. The selected and/or the determined attribute levels may then be used to determine preference information for the respondent. If Done icon 730 is not selected, flow returns to step S601. Continuing with the above example, FIG. 10 shows that the respondent has manipulated interface control 722 to indicate that the Polo attribute level of the Brand attribute is acceptable. This indication is received in step S601, and attribute levels are determined in step S602 as described above. The determination, however, is based on the selected level of the Brand attribute as well as the previously-selected attribute levels of the Price attribute.

Figure 11:
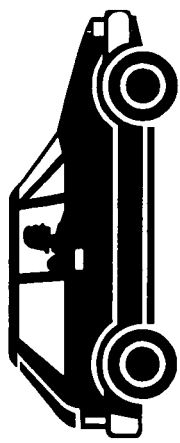
FIG. 11 is a view of an interface used to receive indications from a respondent according to some embodiments of the present invention.

The determined attribute levels are presented to the respondent in step S603. As shown in FIG. 11, the determined attribute levels of the Horsepower and Style attributes are, according to the associations reflected in FIG. 5, identical to those presented in FIG. 9. Flow then continues to step S604 and proceeds as described above.

Figure 12:
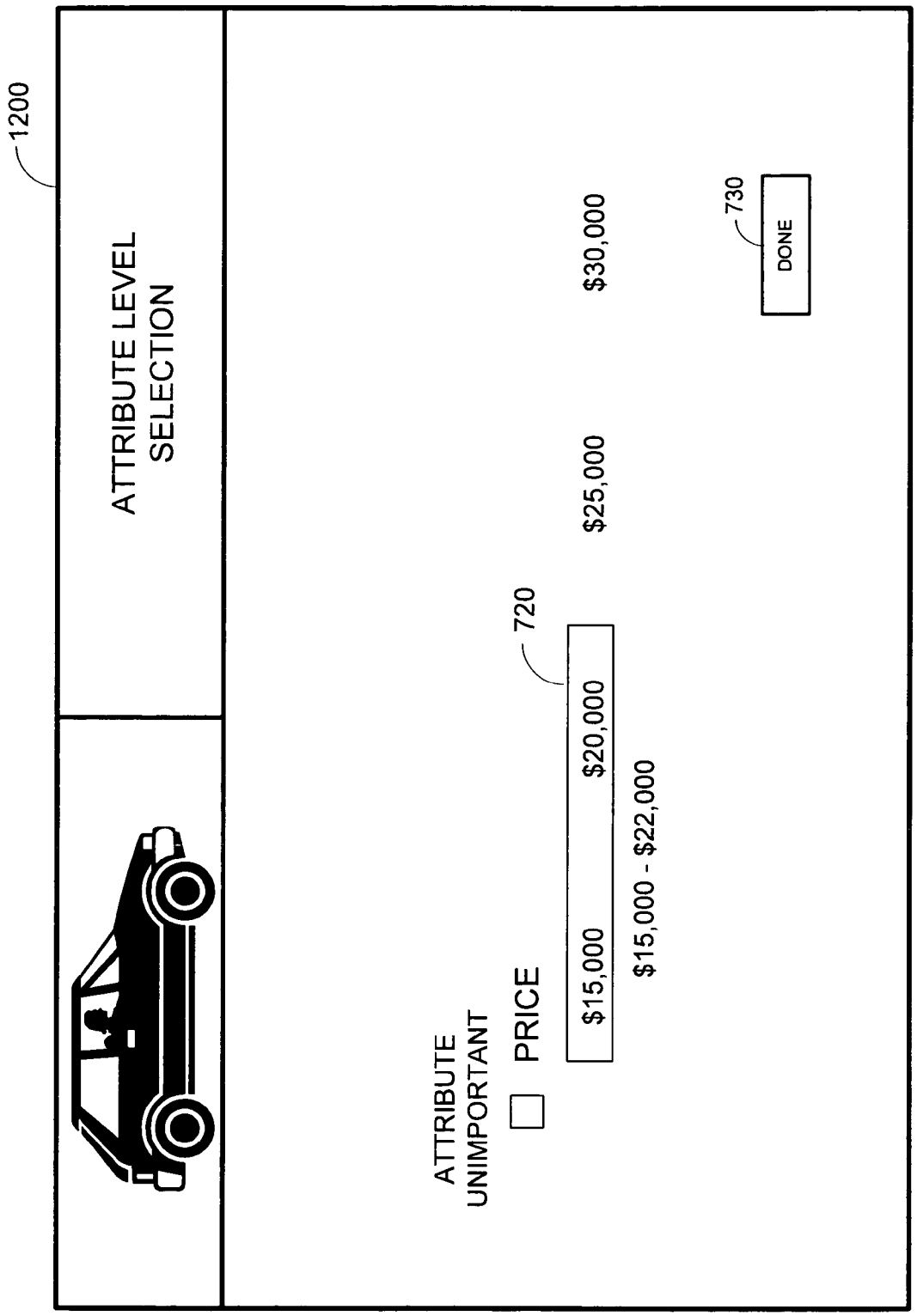
FIG. 12 is a view of an interface used to receive indications from a respondent according to some embodiments of the present invention.

FIG. 12 illustrates an embodiment that varies slightly from process steps 600. According to the illustrated embodiment, interface 1200 presents a plurality of attribute levels of a first attribute. As shown, the respondent manipulates interface control 720 as described above to indicate acceptable attribute levels. In contrast to process steps 600, attribute levels of a second attribute are determined after selection of Done icon 730. Again, the determination is based on the selected attribute levels and on an association between one or more attribute levels of the first attribute and one or more attribute levels of the second attribute.

Figure 13:
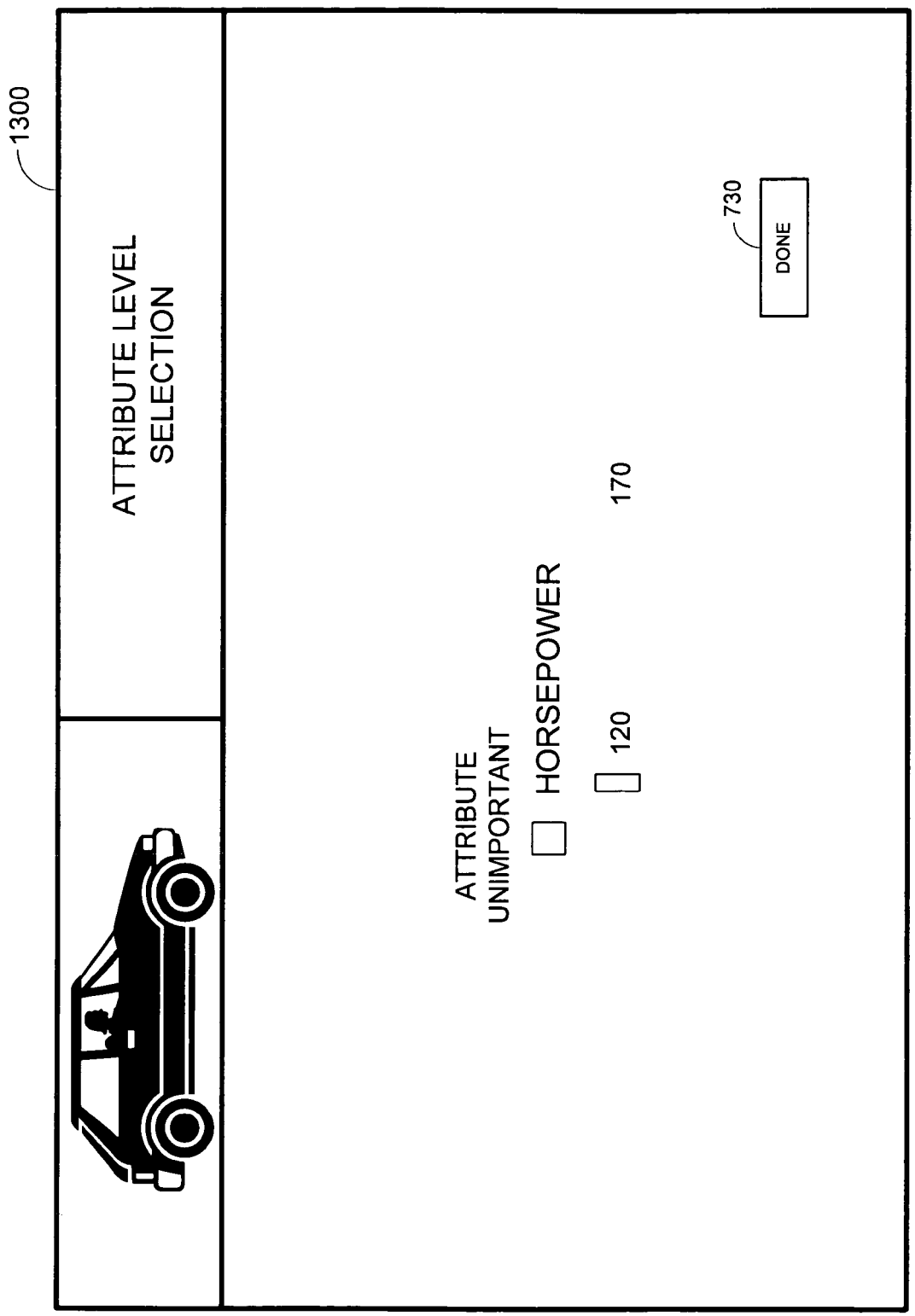
FIG. 13 is a view of an interface used to receive indications from a respondent according to some embodiments of the present invention.

The determined attribute levels of the second attribute are then presented to the respondent. However, attribute levels of only one attribute are simultaneously presented. Accordingly, the respondent is presented with user interface 1300 of FIG. 13. Interface 1300 shows the determined attribute levels for the second attribute. Such embodiments may facilitate respondent selection of acceptable attribute levels.

Figure 14:
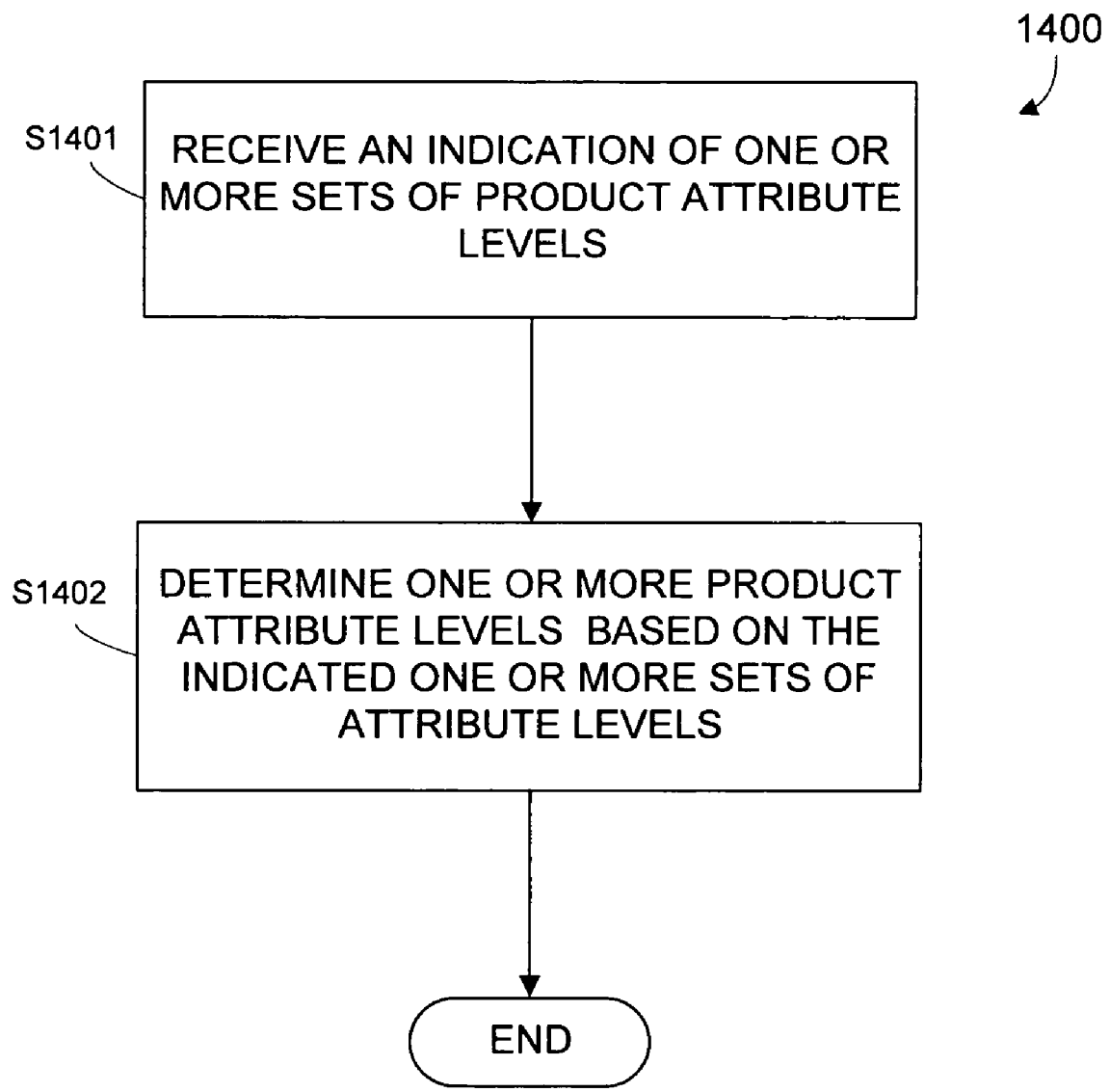
FIG. 14 comprises a flow diagram of process steps according to some embodiments of the present invention.

FIG. 14 comprises a flow diagram of process steps 1400 to determine attribute levels according to some embodiments of the present invention. Process steps 1400 are described herein as being performed by server 200 through execution of processor-executable process steps of server application 292 by microprocessor 210. Process steps 1400 may also be performed, in whole or in part, by one or more of server 200, client systems 300 and 301, respondent devices 500 and 501, another device, and manual means.

Some embodiments of process steps 1400 include receiving an indication of a respondent of one or more sets of product attribute levels, each of the one or more sets of attribute levels comprising one or more attribute levels of a plurality of product attributes, and determining one or more attribute levels based on the one or more sets of attribute levels.

One or more sets of attribute levels are determined prior to steps 1400. Each set of attribute levels includes one attribute level for each of two or more attributes. The sets may be determined based on preference information of the respondent that was previously obtained using conventional systems. The sets may be based on actual products. In this regard, each set may reflect the attribute levels of a particular product.

Each set may be determined based on associations such as those represented in FIG. 5. For example, sets of consistent attribute levels may be determined based on the associations so as to each represent a particular product. The products represented by each set may be presented to the respondent as shown in FIG. 15.

Figure 15:
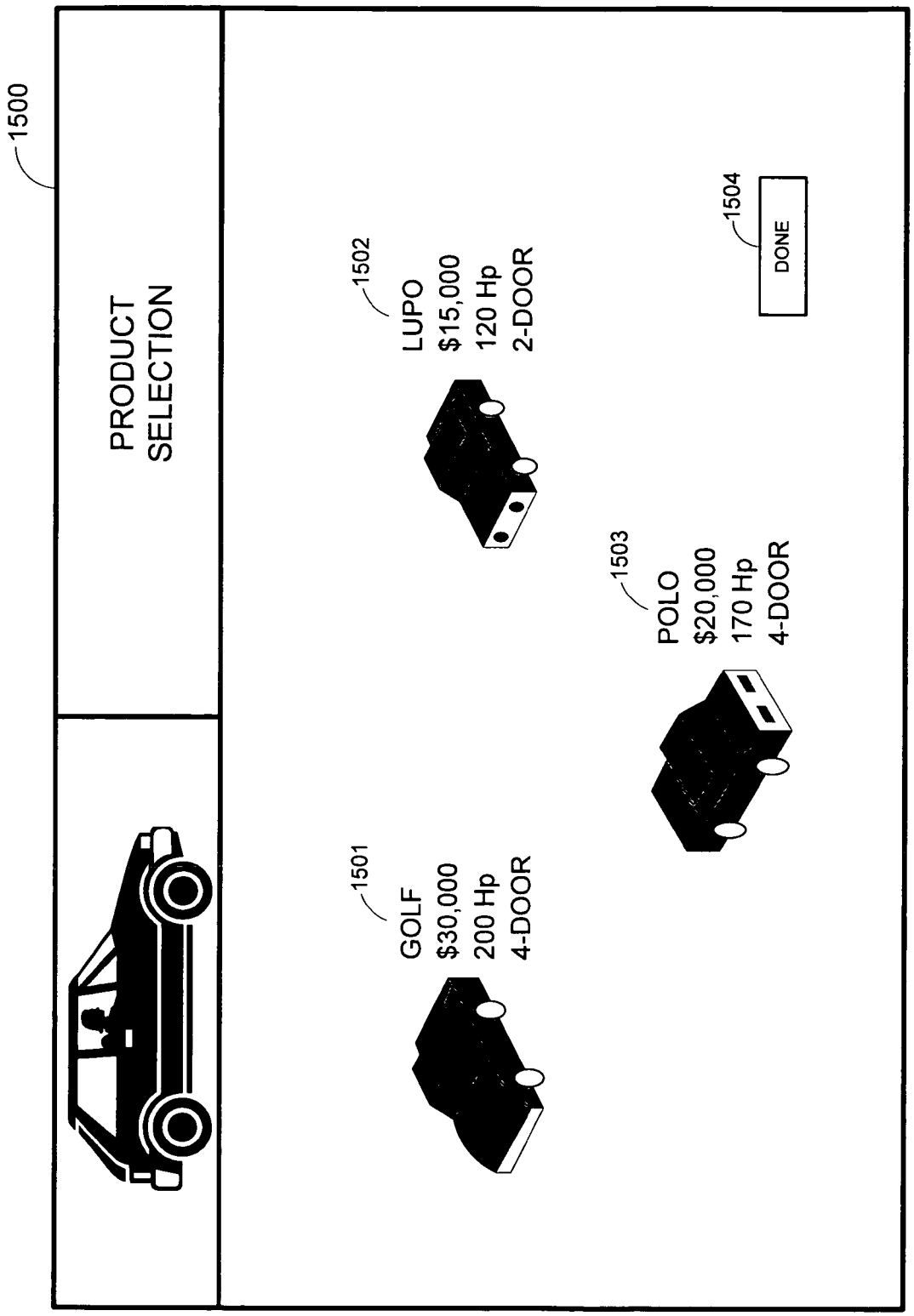
FIG. 15 is a view of an interface used to receive indications from a respondent according to some embodiments of the present invention.

More particularly, FIG. 15 shows interface 1500, which may be presented by on display 550. Interface 1500 includes selectable elements 1501 through 1503, each of which is associated with a set of attribute levels. Each set of attribute levels obeys the associations reflected in FIG. 5. The respondent selects one or more of the sets of attribute levels by selecting associated selectable elements, and, after selection of Done icon 1504, an indication of the selected set(s) is received in step S1401.

Next, in step S1402, one or more attribute levels are determined based on the indicated sets. In some embodiments, the determined attribute levels are identical to the attribute levels of the selected set(s). Each attribute level of each selected set may also be associated with a range. In the latter cases, the attribute levels determined in step S1402 may be those attribute levels that fall within the range associated with each attribute level of each selected set.

For example, each attribute level of the Price attribute may be associated with a range of +/−20%. In a case that $20,000 is an attribute level of a selected set, an associated range of attribute levels includes $16,000 through $24,000. Accordingly, all attribute levels within this range are determined in step S1402. These determined attribute levels may include any combination of prices between $16,000 and $24,000 spaced at any increment. Such a determination may be performed for each attribute level of the selected set(s). Of course, each attribute level may be associated with a unique range. Generally, each attribute level may be associated with a particular mapping that maps the attribute level to other attribute levels. The other attribute levels are therefore determined in step S1402 based on the indicated attribute levels.

Process steps 1400 terminate after step S1402. As described with respect to process steps 600, the indicated sets of attribute levels and/or the determined attribute levels may then be used to determine preference information for the respondent.

Although the present invention has been described with respect to particular embodiments thereof, those skilled in the art will note that various substitutions may be made to those embodiments described herein without departing from the spirit and scope of the present invention. For example, the interfaces, graphical elements and interface controls described herein merely represent some of the many examples of these features that may be used in conjunction with some embodiments of the invention.

What is claimed is:

1. A computer-implemented method for identifying available combinations of attribute levels for a type of product, the method comprising:

maintaining, in a computer memory storage system, data that specifies:
multiple different attributes that are characteristic of a type of product and, for at least some of the attributes, corresponding attribute levels that represent different possible values of the attribute to which they correspond, including a first attribute that is characteristic of the type of product and multiple attribute levels for the first attribute that represent different possible values of the first attribute, and a second attribute that is characteristic of the type of product and that is different from the first attribute and multiple attribute levels for the second attribute that represent different possible values of the second attribute, and combinations of attribute levels for different attributes that are available in a set of actual product offerings of the product type;

causing a display of the first attribute and attribute levels for the first attribute;

receiving an indication of one or more attribute levels for the first attribute that a respondent identified as being acceptable attribute levels for the first attribute from among the displayed attribute levels for the first attribute;

in response to receiving the indication of the one or more acceptable attribute levels for the first attribute, comparing the one or more acceptable attribute levels for the first attribute to the data that specifies the combinations of attribute levels for different attributes that are available in the set of actual product offerings of the product type;

based on results of comparing the one or more acceptable attribute levels for the first attribute to the data that specifies the combinations of attribute levels for different attributes that are available in a set of actual product offerings of the product type, determining that, within the set of actual product offerings of the product type, at least one of the attribute levels for the second attribute is not available in combination with the one or more acceptable attribute levels for the first attribute; and as a consequence of having determined that the at least one attribute level for the second attribute is not available in combination with the one or more acceptable attribute levels for the first attribute, causing a display of an indication that the at least one attribute level for the second attribute is not available in combination with the one or more acceptable attribute levels for the first attribute.

2. The method according to claim 1, wherein:

causing a display of the first attribute and attribute levels for the first attribute includes causing a display of the second attribute and attribute levels for the second attribute such that the first attribute and the attribute levels for the first attribute are displayed concurrently with the second attribute and the attribute levels for the second attribute; and causing a display of an indication that the at least one attribute level for the second attribute is not available in combination with the one or more acceptable attribute levels for the first attribute includes causing the display of the second attribute and the attribute levels for the second attribute to be updated to reflect that the at least one attribute level for the second attribute is not available in combination with the one or more acceptable attribute levels for the first attribute.

3. The method according to claim 1, further comprising:

maintaining, in the computer memory storage system, a third attribute that is characteristic of the type of product and multiple attribute levels for the third attribute that represent different possible values of the third attribute;

causing a display of the second attribute and attribute levels for the second attribute;

receiving an indication of one or more attribute levels for the second attribute that the respondent identified as being acceptable attribute levels for the second attribute from among the displayed attributes levels for the second attribute;

based on the received indication of the one or more acceptable attribute levels for the first attribute, the received indication of the one or more acceptable attribute levels for the second attribute, and the data that specifies combinations of attribute levels for different attributes that are available in the set of actual product offerings of the product type, determining that at least one of the attribute levels for the third attribute is not available in combination with the one or more acceptable attribute levels for the first attribute and the one or more acceptable attribute levels for the second attribute from the set of actual product offerings; and as a consequence of having determined that the at least one attribute level for the third attribute is not available in combination with the one or more acceptable attribute levels for the first attribute and the one or more acceptable attribute levels for the second attribute, causing a display of an indication that the at least one attribute level for the third attribute is not available in combination with the one or more acceptable attribute levels for the first attribute and the one or more acceptable attribute levels for the second attribute.

4. The method according to claim 1, further comprising:

causing a display of the second attribute and attribute levels for the second attribute that are available in combination with the one or more acceptable attribute levels for the first attribute;

receiving an indication that the respondent identified one or more attribute levels for the second attribute that are available in combination with the one or more acceptable attribute levels for the first attribute as acceptable attribute levels for the second attribute; and determining preference information for the respondent based on the received indication of the one or more acceptable attribute levels for the first attribute and the received indication of the one or more acceptable attribute levels or the second attribute.

5. The method according to claim 1, further comprising:

after receiving the indication of the one or more acceptable attribute levels for the first attribute, causing the display of the first attribute and attribute levels for the first attribute to be removed, wherein causing a display of an indication that the at least one attribute level for the second attribute is not available in combination with the one or more acceptable levels for the first attribute includes:

after causing the display of the first attribute and attribute levels for the first attribute to be removed, causing a display of the second attribute and attribute levels for the second attribute that are available in combination with the one or more acceptable attribute levels for the first attribute without displaying the at least one attribute level for the second attribute that is not available in combination with the one or more acceptable levels for the first attribute such that the first attribute and attribute levels of only one for the first attribute are not displayed concurrently with the second attribute and attribute levels for the second attribute.

6. The method according to claim 5, further comprising:

after causing the display of the second attribute and attribute levels for the second attribute that are available in combination with the one or more acceptable attribute levels for the first attribute, receiving an indication of one or more attribute levels for the second attribute that the respondent identified as being acceptable attribute levels for the second attribute from among the displayed attribute levels for the second attribute;

based on the received indication of the one or more acceptable attribute levels for the first attribute, the received indication of the one or more acceptable attribute levels for the second attribute, and the data that specifies the combinations of attribute levels for different attributes that are available in the set of actual product offerings of the product type, determining that at least one of the attribute levels for the third attribute is not available in combination with the one or more acceptable attribute levels for the first attribute and the one or more acceptable attribute levels for the second attribute from the set of actual product offerings; and as a consequence of having determined that the at least one attribute level for the third attribute is not available in combination with the one or more acceptable attribute levels for the first attribute and the one or more acceptable attribute levels for the second attribute, causing a display of an indication that the at least one attribute level for the third attribute is not available in combination with the one or more acceptable attribute levels for the first attribute and the one or more acceptable attribute levels for the second attribute.

7. A computer-implemented method for identifying acceptable attribute levels for a type of product, the method comprising:

accessing, from a computer memory storage system, data that specifies multiple different attributes that are characteristic of a type of product and, for at least some of the attributes, corresponding attribute levels that represent different possible values of the attribute to which they correspond;

based on the accessed data, generating multiple different representative product offerings for the type of product, individual representative product offerings specifying an attribute level for each of at least three different attributes of the type of product;

causing a display of the multiple different representative product offerings for the type of product, each individual displayed representative product offering including indications of the attribute levels specified for each of the at least three different attributes of the type of product by the representative product offering;

receiving an indication of a designation by a respondent of one or more of the displayed representative product offerings as being acceptable;

based on the one or more representative product offerings designated as being acceptable by the respondent, identifying, as acceptable to the respondent, the attribute levels for each of the at least three different attributes of the type of product specified by each of the one or more representative product offerings designated as being acceptable by the respondent; and as a consequence of identifying attribute levels for each of the at least three different attributes of the type of product that are acceptable to the respondent:

determining a range of acceptable attribute levels for a first of the three different attributes, the range of acceptable attribute levels determined for the first attribute including the attribute levels previously identified as being acceptable to the respondent for the first attribute and at least one other additional attribute level for the first attribute that was not previously identified as an acceptable attribute level for the first attribute, and determining a range of acceptable attribute levels for a second of the three different attributes, the range of acceptable attribute levels determined for the second attribute including the attribute levels previously identified as being acceptable to the respondent for the second attribute and at least one other additional attribute level for the second attribute that was not previously identified as an acceptable attribute level for the second attribute.

8. The method according to claim 7, wherein:

causing a display of the multiple different representative product offerings for the type of product includes causing a display of visual indications of multiple different actual product offerings and corresponding attribute levels that reflect actual attribute levels of the actual product offerings; and receiving an indication of a designation by the respondent of one or more of the displayed representative product offerings as being acceptable includes receiving an indication of a selection by the respondent of one or more of the visual indications of the actual product offerings.

9. The method according to claim 7, further comprising:

determining preference information for the respondent based on the determined ranges of acceptable attribute levels for the first and second attributes.

10. The method according to claim 7, further comprising determining preference information for the respondent, wherein generating multiple different representative product offerings for the type of product includes generating multiple different representative product offerings for the type of product based on the determined preference information for the user.

11. The method according to claim 10, wherein determining the preference information for the respondent further comprises:

presenting a plurality of trade-off questions to the respondent; and receiving respondent answers to the plurality of trade-off questions.

12. A computer-implemented method for managing an interface comprising:

causing a display, within a user interface, of a first attribute that is characteristic of a type of product and elements representing attribute levels for the first attribute;

receiving data from a first interface control indicating that a respondent selected one or more of the elements representing attribute levels for the first attribute as acceptable attribute levels for the first attribute;

accessing, from a computer memory storage system, data that specifies combinations of attribute levels for the first and second attributes that are available in actual product offerings of the product type;

comparing the one or more attribute levels for the first attribute selected by the respondent as acceptable attribute levels for the first attribute to the accessed data that specifies combinations of attribute levels for the first and second attributes that are available in actual product offerings of the product type;

based on results of comparing the one or more attribute levels for the first attribute selected by the respondent as acceptable attribute levels for the first attribute to the accessed data that specifies combinations of attribute levels for the first and second attributes that are available in actual product offerings of the product type, determining one or more attribute levels for the second attribute that are available in combination with the one or more attribute levels for the first attribute selected by the respondent as acceptable attribute levels for the first attribute; and causing the user interface to be updated to reflect at least one attribute level for the second attribute that was determined to be available in combination with the one or more attribute levels for the first attribute selected by the respondent as acceptable attribute levels for the first attribute.

13. The method of claim 12, further comprising:
receiving data from a second interface control indicating that the respondent identified one of a plurality of attributes as unimportant.

14. A device comprising:
a processor; and
a storage device in communication with the processor, the storage device storing:
  data that specifies:
    multiple different attributes that are characteristic of a type of product and, for at least some of the attributes, corresponding attribute levels that represent different possible values of the attribute to which they correspond, including a first attribute that is characteristic of the type of product and multiple attribute levels for the first attribute that represent different possible values of the first attribute, and a second attribute that is characteristic of the type of product and that is different from the first attribute and multiple attribute levels for the second attribute that represent different possible values of the second attribute, and
    combinations of attribute levels for different attributes that are available in a set of actual product offerings of the product type; and
  instructions adapted to be executed by the processor that, when executed by the processor, cause the processor to:
    cause a display of the first attribute and attribute levels for the first attribute,
    receive an indication of one or more attribute levels for the first attribute that a respondent identified as being acceptable attribute levels for the first attribute from among the displayed attribute levels for the first attribute,
    in response to receiving the indication of the one or more acceptable attribute levels for the first attribute, compare the one or more acceptable attribute levels for the first attribute to the data that specifies the combinations of attribute levels for different attributes that are available in the set of actual product offerings of the product type,
    based on results of comparing the one or more acceptable attribute levels for the first attribute to the data that specifies the combinations of attribute levels for different attributes that are available in a set of actual product offerings of the product type, determine that, within the set of actual product offerings of the product type, at least one of the attribute levels for the second attribute is not available in combination with the one or more acceptable attribute levels for the first attribute, and
    as a consequence of having determined that the at least one attribute level for the second attribute is not available in combination with the one or more acceptable attribute levels for the first attribute, cause a display of an indication that the at least one attribute level for the second attribute is not available in combination with the one or more acceptable attribute levels for the first attribute.

15. A device comprising:
a processor; and
a storage device in communication with the processor, the storage device storing instructions adapted to be executed by the processor that, when executed by the processor, cause the processor to:
  access, from a computer memory storage system, data that specifies multiple different attributes that are characteristic of a type of product and, for at least some of the attributes, corresponding attribute levels that represent different possible values of the attribute to which they correspond,
  based on the accessed data, generate multiple different representative product offerings for the type of product, individual representative product offerings specifying an attribute level for each of at least three different attributes of the type of product,
  cause a display of the multiple different representative product offerings for the type of product, each individual displayed representative product offering including indications of the attribute levels specified for each of the at least three different attributes of the type of product by the representative product offering,
  receive an indication of a designation by a respondent of one or more of the displayed representative product offerings as being acceptable,
  based on the one or more representative product offerings designated as being acceptable by the respondent, identify as acceptable to the respondent, the attribute levels for each of the at least three different attributes of the type of product specified by each of the one or more representative product offerings designated as being acceptable by the respondent, and
  as a consequence of identifying attribute levels for each of the at least three different attributes of the type of product that are acceptable to the respondent:
    determine a range of acceptable attribute levels for a first of the three different attributes, the range of acceptable attribute levels determined for the first attribute including the attribute levels previously identified as being acceptable to the respondent for the first attribute and at least one other additional attribute level for the first attribute that was not previously identified as an acceptable attribute level for the first attribute, and
    determine a range of acceptable attribute levels for a second of the three different attributes, the range of acceptable attribute levels determined for the second attribute including the attribute levels previously identified as being acceptable to the respondent for the second attribute and at least one other additional attribute level for the second attribute that was not previously identified as an acceptable attribute level for the second attribute.

16. A computer-implemented method for determining consumer attribute preferences comprising:

maintaining, in a computer memory storage system, data that specifies:

multiple different attributes that are characteristic of a type of product and, for at least some of the attributes, corresponding attribute levels that represent different possible values of the attribute to which they correspond, including a first attribute that is characteristic of the type of product and multiple attribute levels for the first attribute that represent different possible values of the first attribute, and a second attribute that is characteristic of the type of product and that is different from the first attribute and multiple attribute levels for the second attribute that represent different possible values of the second attribute, and combinations of attribute levels for different attributes that are available in a set of actual product offerings of the product type;

causing a display of the first attribute and corresponding attribute levels for the first attribute;

causing a display of the second attribute and corresponding attribute levels for the second attribute;

receiving an indication of a selection of an attribute level for the first attribute from among the displayed attribute levels for the first attribute;

as a consequence of receiving the indication of the selected attribute level for the first attribute:

comparing the selected attribute level for the first attribute to the data that specifies the combinations of attribute levels for different attributes that are available in a set of actual product offerings of the product type, and based on results of comparing the selected attribute level for the first attribute to the data that specifies the combinations of attribute levels for different attributes that are available in a set of actual product offerings of the product type, determining that one or more of the displayed attribute levels for the second attribute are not available in combination with the selected attribute level for the first attribute; and causing the display of the attribute levels for the second attribute to be updated to remove the one or more of the attribute levels determined not to be available in combination with the selected attribute level for the first attribute.

17. The method according to claim 1, further comprising:

causing a display of the second attribute and attribute levels for the second attribute;

causing a display of a third attribute and attribute levels for the third attribute;

providing controls that enable the respondent to identify one or more of the first attribute, the second attribute, and the third attribute as unimportant;

based on the received indication of the one or more acceptable attribute levels for the first attribute and the data that specifies combinations of attribute levels for different attributes that are available in the set of actual product offerings of the product type, determining that at least one of the displayed attribute levels for the third attribute is not available in combination with the one or more acceptable attribute levels for the first attribute from the set of actual product offerings;

as a consequence of having determined that the at least one displayed attribute level for the third attribute is not available in combination with the one or more acceptable attribute levels for the first attribute, causing the display of the attribute levels for the third attribute to be updated to remove the at least one displayed attribute level for the third attribute determined not to be available in combination with the one or more acceptable attribute levels for the first attribute;

after the display of the attribute levels for the third attribute has been updated, receiving an indication of a selection by the respondent of the control that enables the respondent to identify the third attribute as unimportant; and as a consequence of receiving the indication of the selection of the control that enables the respondent to identify the third attribute as unimportant, removing the display of the third attribute and the remaining displayed attribute levels for the third attribute, wherein:

determining that at least one of the attribute levels for the second attribute is not available in combination with the one or more acceptable attribute levels for the first attribute from the set of actual product offerings includes determining that at least one of the displayed attribute levels for the second attribute is not available in combination with the one or more acceptable attribute levels for the first attribute from the set of actual product offerings, and causing a display of an indication that the at least one attribute level for the second attribute is not available in combination with the one or more acceptable attribute levels for the first attribute includes causing the display of the attribute levels for the second attribute to be updated to remove the at least one displayed attribute level for the second attribute determined not to be available in combination with the one or more acceptable attribute levels for the first attribute.

18. The method according to claim 7, wherein:

determining a range of acceptable attribute levels for the first attribute includes determining a range of acceptable attribute levels for the first attribute as a function of the attribute levels for the first attribute specified by the one or more representative product offerings designated by the respondent as being acceptable; and determining a range of acceptable attribute levels for the second attribute includes determining a range of acceptable attribute levels for the second attribute as a function of the attribute levels for the second attribute specified by the one or more representative product offerings designated by the respondent as being acceptable.

19. The method according to claim 7, further comprising transmitting the determined range of acceptable attribute levels for the first attribute and the determined range of acceptable attribute levels for the second attribute to another computer system for review by a third party.

* * * * *